(12) United States Patent
Servaty et al.

(10) Patent No.: US 6,716,950 B2
(45) Date of Patent: Apr. 6, 2004

(54) MATERIAL FOR SOLAR BENCHES

(75) Inventors: Sabine Servaty, Grosslitten (DE); Rolf Neeb, Pfungstadt (DE); Guenther Ittmann, Gross-Umstadt (DE)

(73) Assignee: Roehm GmbH & Co. KG, Darmstadt (DE)

( * ) Notice: Subject to any disclaimer, the term of this patent is extended or adjusted under 35 U.S.C. 154(b) by 51 days.

(21) Appl. No.: 09/838,312

(22) Filed: Apr. 20, 2001

(65) Prior Publication Data

US 2002/0052460 A1 May 2, 2002

(30) Foreign Application Priority Data

Aug. 11, 2000 (DE) .......................... 100 40 060

(51) Int. Cl.$^7$ .............................. C08F 120/18
(52) U.S. Cl. ............... 526/329.7; 526/319; 526/228; 526/232.3; 525/330.6; 525/384; 427/466
(58) Field of Search ................. 526/319, 228, 526/329.7, 232.3; 525/330.6, 38.4; 427/466

(56) References Cited

U.S. PATENT DOCUMENTS

| 3,857,808 | A | * | 12/1974 | Crozier et al. | ............... 524/714 |
|---|---|---|---|---|---|
| 4,259,429 | A | * | 3/1981 | Gilliams et al. | ............. 430/124 |
| 4,381,136 | A | * | 4/1983 | Hosch et al. | ................ 359/361 |
| 4,550,136 | A | * | 10/1985 | Hosch | ......................... 524/718 |
| 4,719,146 | A | * | 1/1988 | Hohage et al. | ............. 428/213 |
| 5,300,601 | A | * | 4/1994 | Besecke et al. | ............. 526/228 |
| 5,466,756 | A | * | 11/1995 | Roach et al. | ............. 525/330.6 |

FOREIGN PATENT DOCUMENTS

| DE | 0 164663 | * | 5/1985 |
| DE | 3838480 | * | 6/1989 |
| DE | 19750434 | * | 1/1991 |
| DE | 19605154 A1 | * | 8/1997 |
| JP | 05156113 | * | 12/1991 |

OTHER PUBLICATIONS

"Condensed Chemical Dictionary", Lewis, John Wiley & Sons, INC, 13-th edition, p. 14, 1997.*

* cited by examiner

Primary Examiner—Tatyana Zalukaeva
(74) Attorney, Agent, or Firm—Oblon, Spivak, McClelland, Maier & Neustadt, P.C.

(57) ABSTRACT

The invention describes a polymer with high transmission for UV rays, this transmission being preserved even after prolonged exposure to UV light (tanning lamps). The polymer is further characterized by a low residual monomer content (determined as methyl methacrylate).

20 Claims, No Drawings

MATERIAL FOR SOLAR BENCHES

FIELD OF THE INVENTION

The present invention relates to an improved material for covering the UV lamps in tanning beds.

PRIOR ART

From European Patent 0016870 there are already known plastics based on methyl methacrylate which have high transmission for UV A radiation (315 to 380 nm) and for UV B radiation (280 to 315 nm). Their high UV transmission is preserved even during prolonged exposure to radiation if the plastic contains a small concentration of a sterically hindered amine. Corresponding compounds trap radicals which are formed during radiation exposure and which would otherwise slowly destroy the plastic material. Such additives are described in Japanese Patent 03-47856, and are known as "hindered amine light stabilizers" or HALS. Plastics which are based on polymethyl methacrylate (PMMA), which contain sterically hindered amines and which have high UV transmission are also described in German Unexamined Specification DE-OS 3421859.

Heretofore Plexiglas® GS 2458 (commercial product of Rohm GmbH) has been used to cover the UV lamps of tanning beds. The material is easy to care for and transmits a high percentage of tanning UV radiation. The thickness of the covers used has ranged between 3 and 8 mm.

Since both the radiant power of UV lamps on the whole and the UVB component of the radiation have increased in the course of technical development, a considerable reduction of transmission is suffered in standard materials with thicknesses of >4 mm after about 20 hours of exposure.

Exposure Results

In this case: standard formula (Plexiglas® 2458), 8 mm thick, tempered (30 minutes, 160° C.). Lamp: light box, Ergoline ST Turbo Power lamps, 9 tubes:

| Irradiation time (h) | 0 | 50 | 125 | 275 | 475 |
|---|---|---|---|---|---|
| Transmission at 315 nm in % | 80 | 60 | 45 | 33 | 25 |

A yellow discoloration known as yellow core develops in the interior of the plate. The UV light is absorbed, the customer no longer becomes tanned and the plate must be replaced relatively early.

Object

The object was therefore to provide a material which, even at the lamp intensities that are common today, yellows not at all or only slightly while also having high UV transmission. At the same time, it must be ensured that the additives which prevent development of the yellow core are physiologically safe. Only substances which are approved by the FDA and are in conformity with the European Union and German Health Agency directives may be added. It is intended that plates will be made available which do not exhibit yellow core even at the lamp powers which are standard today in combination with material thicknesses of more than 4 mm. The large thicknesses of more than 4 mm are necessary, since the cover of the UV lamps has cantilever structure and the plates are hot-formed at about 160° C.

Achievement

Good UV transmission over a long period is a primary requirement for tanning bed material.

It has now been found that the object can be achieved by addition of alcohols, alcohol mixtures and even water and/or further compounds to the monomer mixture of the standard formula. The compound or the mixture respectively being used will be referred to hereinafter as active components. Examples of suitable alcohols are monohydric or polyhydric C1 to C10 alcohols, which may also be branched, such as methanol, ethanol, propanol, isopropanol or tert-butanol or pentanols. A further improvement can be achieved by the use of further compounds, such as vinyl compounds, butyl lactate and siloxanes as well as mixtures of the said compounds. Vinyl compounds can be understood as vinyl esters of aliphatic carboxylic acids, such as vinyl acetate. There can also be used vinyl esters of general formula I:

[see original for formula] (Formula I)

where:
$R_1$, $R_2$ and $R_3$ are alkyl groups, wherein at least one group represents a methyl group. The total number of carbon atoms in groups $R_1$ to $R_3$ is 9, 10 or 11.

The compounds of formula I are available from Shell Chemicals under the names VeoVa9 (9 carbon atoms, $R_1$ to $R_3$), VeoVa10 (10 carbon atoms, $R_1$ to $R_3$) or VeoVa11 (11 carbon atoms, $R_1$ to $R_3$).

The alcohols, alcohol mixtures or further active components are mixed in with the monomer mixture in proportions of 0.1 to 10 wt %. Contents of 0.2 to 8 wt % of active components are preferred, and contents of 0.2 to 6 wt % of active components are especially preferred.

Methyl methacrylate comprises 85 to 95 wt % of the monomer mixture.

Composition of the standard formula:

| | |
|---|---|
| 93.85 wt % | Methyl methacrylate |
| 6% | Acetyl tributyl citrate (as plasticizer) Citrofol B2 (Jungbunzlauer Co.) |
| 0.1 wt % | Tinuvin 770 (Ciba) (HALS) |
| 0.05 wt % | Initiator |

As initiator there can be used the initiators that are standard in cast polymerization; see H. Rauch-Puntigam, Th. Völker in "Acrylic and Methacrylic Compounds", Springer-Verlag 1967; Houben-Weyl, 4th Edition, Volume XIV/1, Macromolecular Substances, Part 1, pp. 1010 to 1078, Georg Thieme Verlag, 1961).

As plasticizer there can be used acetyl tributyl citrate or triethyl citrate. In some cases it may also be possible to omit the plasticizer.

EXAMPLES

General Manufacturing Procedure

The standard formula and the mixtures of active compounds are intimately mixed, filled into glass chambers sealed with PVC shaped cord and polymerized in the water bath under the following temperature and time conditions:

| Duration (h) | 6–7 | 15 | 4 |
|---|---|---|---|
| Temperature (° C.) | 46 | 40 | 100 |

After the first polymerization step, the shaped cord is removed. After the 2nd polymerization step, final polymerization takes place at elevated temperature. If necessary, further tempering at elevated temperature (160° C.) can be performed.

The resulting PMMA plate is cut to size (100×30×8 mm) and exposed. Exposure of the specimens was accomplished using Philips UVA+UVB Performance individual lamps or Ergoline Turbo Power individual lamps or on an Ergoline light box with 9 Ergoline Turbo Power lamps.

The Ergoline SR Turbo Power lamp (manufactured by IK Licht GmbH, Item No. 1085518) has an electrical power of 160 W and a UVA radiant flux of 38 watt.

EXAMPLES

Example 1

Standard Formula

| Time (h) | 0 | 67 | 115 | 223 | 731 |
|---|---|---|---|---|---|
| Transmission tau (315 nm) | 80 | 53 | 46 | 33 | 17 |

Exposure is performed on Ergoline SR Turbo Power

Example 2

Composition
Standard+
0.095 wt % of methanol
0.95 wt % of ethanol
0.95 wt % of isopropanol
0.5 wt % of $H_2O$ The MMA content of the standard formula was correspondingly reduced.

| Time (h) | 0 | 5 | 117 | 213 | 577 |
|---|---|---|---|---|---|
| Transmission tau (315 nm) | 81 | 75 | 83 | 85 | 87 |

Exposure is performed on Ergoline SR Turbo Power

The percentages plus standard add up to 100%, the content of methyl methacrylate being reduced by an amount corresponding to the content of active compounds.

Example 3

Composition
Standard+
0.095 wt % of methanol
0.95 wt % of ethanol
0.95 wt % of isopropanol
0.5 wt % of butyl lactate

| Time (h) | 0 | 20 | 133 | 329 | 464 |
|---|---|---|---|---|---|
| Transmission tau (315 nm) | 83 | 70 | 85 | 87 | 88 |

Exposure is performed in the Ergoline SR Turbo Power light box

As a further positive effect of the alcohol addition, it was surprisingly found that the content of residual monomers, measured as methyl methacrylate, decreases from the usual 0.3 to 0.4 wt % to 0.2 wt %.

A particularly large decrease of residual monomer content is found when alcohol and vinyl acetate are used. In this case the residual monomer content decreases to 0.019 wt %.

Residual Monomer Contents

| Example | Wt % (as methyl methacrylate) |
|---|---|
| 1 | 0.41 |
| 2 | 0.22 |
| 3 | 0.19 |
| 4 | 0.019 |
| 5 | not determined |
| 6 | 0.067 |
| 7 | 0.031 |

The residual monomer contents were determined by vapor space gas chromatography.

Example 4

Standard+
0.5 wt % of $H_2O$
0.95 wt. % of ethanol
0.5 wt. % of vinyl acetate

| Time (h) | 0 | 96 | 252 | 384 | 636 |
|---|---|---|---|---|---|
| Transmission tau (315 nm) | 82 | 72 | 81 | 84 | 86 |

Exposure is performed in the Ergoline SR Turbo Power light box

Example 5

Standard+
0.095 wt % of methanol
0.95 wt % of isopropanol
1.0 wt % of vinyl acetate

| Time (h) | 0 | 16 | 196 | 475 |
|---|---|---|---|---|
| Transmission tau (315 nm) | 82 | 76 | 83 | 87 |

Exposure is performed in the Ergoline SR Turbo Power light box

Example 6

Standard+
0.095 wt % of methanol
1.0 wt % of VEOVA 10
0.95 wt % of ethanol

| Time (h) | 0 | 20 | 63 | 150 | 500 |
|---|---|---|---|---|---|
| Transmission tau (315 nm) | 83 | 71 | 76 | 81 | 87 |

Exposure is performed in the Ergoline SR Turbo Power light box

| Time (h) | 1000 | 1500 | 2000 |
|---|---|---|---|
| Transmission tau (315 nm) | 89 | 90 | 90 |

Exposure is performed in the Ergoline SR Turbo Power light box

Example 7

Formula according to Example 6, but with 3 wt % of VEOVA10 and 3% of Citrofol B2

| Time (h) | 0 | 20 | 150 | 200 | 315 | 1000 | 2000 |
|---|---|---|---|---|---|---|---|
| Transmission tau (315 nm) | 83 | 75 | 77 | 77 | 79 | 85 | 87 |

Exposure is performed in the Ergoline SR Turbo Power light box

Example 8

Standard formula+

0.095 wt % of methanol
0.95 wt % of ethanol
1.0 wt % of butyl lactate

| Time (h) | 0 | 40 | 128 | 380 | 783 |
|---|---|---|---|---|---|
| Transmission tau (315 nm) | 83 | 75 | 85 | 87 | 88 |

Exposure is performed in the Ergoline SR Turbo Power light box

Even after exposures of >1000 hours, the transmission of the inventive plates does not decrease in any of the examples (except for Example 1, "standard").

Example 9

Standard formula+

1.0% of methanol

| Time (h) | 500 | 1000 | 2000 |
|---|---|---|---|
| Transmission tau (315 nm) | 76 | 88 | 85 |

Exposure is performed in the Ergoline SR Turbo Power light box

Example 10

Standard formula+

0.8% of methanol
0.5% of water

| Time (h) | 500 | 1000 | 2000 | 3000 |
|---|---|---|---|---|
| Transmission tau (315 nm) | 73 | 80 | 84 | 84 |

Exposure is performed in the Ergoline SR Turbo Power light box

Example 11

Standard formula+
0.2% of water
0.8% of methanol

| Time (h) | 0 | 67 | 100 | 250 | 500 | 700 |
|---|---|---|---|---|---|---|
| Transmission tau (315 nm) | 87 | 82 | 76 | 82 | 85 | 85 |

Philips UVB Performance

Example 12

Standard formula+
0.5% of water
0.5% of methanol

| Time (h) | 112 | 206 | 275 |
|---|---|---|---|
| Transmission tau (315 nm) | 88 | 89 | 89 |

Exposure is performed with Ergoline SR Turbo Power.

Before exposure, the plate of Example 12 was tempered for 30 minutes at 160° C. Exposure was performed by individual lamps.

What is claimed is:

1. A material obtained by radical polymerization of the following monomer mixture, wherein the amounts add up to 100% of the mixture:

| 88 to 95 wt % | of methyl methacrylate |
|---|---|
| 0 to 7 wt % | of plasticizer |
| 0.01 to 0.5 wt % | of hindered amine light stabilizer compound |
| 0.05 wt % | of initiator and |
| 0.1 to 10 wt % | of at least two active components selected from the group | consisting of alcohols, water, vinyl esters, siloxanes, and butyl lactate.

2. The material according to claim 1, wherein one of the active components is at least one alcohol selected from the group consisting of methanol, ethanol, propanol, isopropanol, n-butanol, sec-butanol, tert-butanol and pentanols.

3. The material according to claim 1, wherein one of the active components is at least one of vinyl acetate and a compound of formula I $$R_2-\underset{\underset{R_3}{|}}{\overset{\overset{R_1}{|}}{C}}-\overset{\overset{O}{\|}}{C}-O-CH=CH_2 \qquad \text{(Formula I)}$$

wherein $R_1$, $R_2$ and $R_3$ are alkyl groups, at least one of which represents a methyl group, the total number of carbon atoms in groups $R_1$ to $R_3$ being 9, 10 or 11.

4. The material according to claim 1, wherein the active components are present in an amount of 0.2 to 8 wt %.

5. The material according to claim 4, wherein the active components are present in an amount of 0.2 to 6 wt %.

6. The material according to claim 1, wherein the active components comprise a mixture of methanol, ethanol, isopropanol and water.

7. The material according to claim 1, wherein the active components comprise a mixture of methanol, ethanol, isopropanol and butyl lactate.

8. The material according to claim 1, wherein the active components comprise a mixture of water, ethanol and vinyl acetate.

9. The material according to claim 1, wherein the active components comprise a mixture of methanol, isopropanol and vinyl acetate.

10. The material according to claim 3, wherein the active components comprise a mixture of methanol, a compound of formula I wherein the total number of carbon atoms in groups $R_1$ to $R_3$ is 10, and ethanol.

11. The material according to claim 10, wherein acetyl tributyl citrate is present as a plasticizer.

12. The material according to claim 1, wherein the active components comprise a mixture of methanol, ethanol and butyl lactate.

13. The material according to claim 1, wherein the active components comprise a mixture of methanol and water.

14. The material according to claim 1, wherein at least one of the active components is an alcohol, and said material contains a maximum residual methyl methacrylate monomer content of 0.22 wt %.

15. The material according to claim 1, in the form of a plate having a thickness of more than 4 mm.

16. The material according to claim 15, wherein the plate has a thickness of 8 mm.

17. A tanning bed lamp cover made from the plate of claim 15.

18. A glazing material made from the plate of claim 15.

19. A tanning bed lamp cover made from the plate of claim 10.

20. A glazing material made from the plate of claim 16.

* * * * *